United States Patent
Rama et al.

(10) Patent No.: US 10,146,876 B2
(45) Date of Patent: Dec. 4, 2018

(54) PREDICTING REAL-TIME CHANGE IN ORGANIC SEARCH RANKING OF A WEBSITE

(71) Applicant: IQUANTI INC., Jersey City, NJ (US)

(72) Inventors: Ajay Kumar Rama, Bangalore (IN); Ranjet Behera, Bangalore (IN); Haider Raza Khan, Bangalore (IN)

(73) Assignee: IQUANTI, INC., Jersey City, NJ (US)

( * ) Notice: Subject to any disclaimer, the term of this patent is extended or adjusted under 35 U.S.C. 154(b) by 428 days.

(21) Appl. No.: 14/709,631

(22) Filed: May 12, 2015

(65) Prior Publication Data

US 2016/0335354 A1      Nov. 17, 2016

(51) Int. Cl.
    *G06F 17/30* (2006.01)

(52) U.S. Cl.
    CPC .... *G06F 17/30867* (2013.01); *G06F 17/3053* (2013.01); *G06F 17/30876* (2013.01)

(58) Field of Classification Search
    None
    See application file for complete search history.

(56) References Cited

U.S. PATENT DOCUMENTS

| | | | |
|---|---|---|---|
| 8,543,570 B1 | 9/2013 | Cramer | |
| 8,676,798 B1 * | 3/2014 | Datta | G06F 17/30864 707/706 |
| 8,869,019 B1 * | 10/2014 | Sampath-Kumar | G06F 17/3089 715/208 |
| 8,924,378 B2 | 12/2014 | Cramer | |
| 8,943,039 B1 * | 1/2015 | Grieselhuber | G06F 17/3089 707/709 |
| 9,116,994 B2 * | 8/2015 | Park | G06F 17/30867 |
| 2010/0036828 A1 * | 2/2010 | Carmel | G06F 17/30722 707/708 |
| 2014/0379462 A1 | 12/2014 | Rangarajan | |

* cited by examiner

*Primary Examiner* — James Trujillo
*Assistant Examiner* — Cheryl M Shechtman
(74) *Attorney, Agent, or Firm* — Blank Rome LLP (57) ABSTRACT

A system and method for predicting a real-time change in an organic search ranking of a website is disclosed. The present invention provides a statistical model and a simulation interface capable of predicting a real-time change in an organic search ranking of a website. The system identifies one or more variables impacting the organic search ranking of a website and assigns an individual score to each variable. The system further enables the user to make modifications in the one or more variable and to visualize the real-time change in ranking by correlating an overall score with the actual organic search ranking.

19 Claims, 13 Drawing Sheets

PREDICTING REAL-TIME CHANGE IN ORGANIC SEARCH RANKING OF A WEBSITE

FIELD OF INVENTION

The present invention relates to a system and a method for predicting a real-time change in organic search ranking of a website. More specifically, the present invention is related to a statistical model and a simulation interface capable of predicting a real-time change in an organic search ranking of a website.

BACKGROUND OF INVENTION

Internet is leveraged with a vast amount of information in form of the web pages or web documents. There are various search engines, such as Google, Bing and Yahoo etc. which help the users in finding out appropriate web-pages according to their search query. Basically, the search engines find the links to relevant results by matching the terms of the search query to a corpus of pre-stored web pages. Web pages that contain the user's search query are considered as "hits" and are returned to the user. These "hits" are arranged according to the organic search ranking of the web pages in accordance with the algorithms associated with the search engines.

Generally, each search engine has its own algorithm for optimal indexation and ranking of the web pages. These algorithms basically index the web pages based on their historical data such as their performance on the search engine, freshness of content, viability, view-ability and theme etc. In order to improve the ranking of a web page or website at a search engine the web page or website has to be optimized.

There are techniques of search engine optimization (SEO) that are generally applied in order to improve the ranking of the web pages. When a search engine analyzes web pages to determine ranking, it typically focuses on the specific web page variables referred to as SEO content fields. These SEO content fields include, for example, Page Title, Meta Description, Meta Keyword, and Image Alternate Description fields etc. There are some other variables known in the prior art that may affect the ranking of a web page such as length of URL, site speed of URL, number of back links, traffic etc.

Generally, a search engine optimizer optimizes the ranking of the websites within the search engine hits by modifying above mentioned variables. Further, in order to track the efforts, the search engine optimizer implements changes to the page or site content, acquire more links from different websites, and then track any resulting changes in rankings to see whether those efforts had any substantial impact on the ranking or not. However, the change in ranking of a web page is visible after a considerable duration of time, for example, in a day, week, month or more. It is difficult to immediately ascertain whether the changes are in favor of the ranking or not and/or in what extent they are impacting the ranking of the website.

Hence, despite of the advancement offered by the techniques of the prior art, there is a further need particularly in the manner of visualizing the real-time changes in the ranking of a web page. No prior art is capable of predicting a real-time change in an organic search ranking of a web page. Further, there is no prior art available that can provide an interface for modifying the variables that affect the ranking of the web pages on a search engine and can predict the real-time ranking of the web page.

Additionally, in recent trends, social media has gained a considerable importance in internet regime. Social variables such as FACEBOOK social network likes and shares, TWITTER social network shares, LINDKEDIN social network likes and shares, and GOOGLE+ social network shares are also started impacting the ranking of the web pages. (FACEBOOK is a trademark of Facebook, Inc. TWITTER is a trademark of Twitter, Inc. LINKEDIN is a trademark of LinkedIn Corporation. GOOGLE+ is a trademark of Google Inc.) Moreover, variables such as page load time, mobile view optimization and mobile application are also gaining significance. However, there is no prior art that considers such variables while real-time analyzing the changes in the ranking of the web page.

In the light of the foregoing, it will be appreciated that what is needed in the art is a system and method capable of enabling a user to make changes in the variables of a webpage and further capable of following the real-time changes being done on competitors' webpages to predict the real-time change in the organic search ranking of the website without any restrictive limitations, inflexibility, and disadvantages.

The subject matter claimed herein is not limited to embodiments that solve any disadvantages or that operate only in environments such as those described above. Rather, this background is only provided to illustrate one exemplary technology area where some embodiments described herein.

SUMMARY OF INVENTION

The invention under study is directed towards a system and a method for predicting real-time change in an organic search ranking of a website.

Embodiments of the present invention disclose a method being implementable on a computing device for predicting a real time change in an organic search ranking of a website, the method comprising: identifying one or more variables that impact the organic search ranking of the website; calculating an overall score based on the one or more variable of the website; calculating a competition score based on changes made on at least one competitor's website, and providing a simulation interface that enables a user to make changes to the one or more variables and to determine a real-time change in organic search ranking of the website based on a change in the overall score and the competition score.

In an embodiment of the present invention, the one or more variables may be on-page variable such as page title, page content, language of content, URL density, meta density, HI density, H2 density and Alt Tag density etc.; off-page variables such as number of links of other websites, type of link and link domain etc.; social variables such as comments on content, content shares, link shares, viewer feedbacks, FACEBOOK likes, FACEBOOK shares, FACEBOOK comments, LINKEDIN likes, LINKEDIN shares and other social networking features etc., and technical variables such as page loading time, page redirects, size of content, site map and robot.txt etc.

In an embodiment of the present invention, the individual impact and/or the individual score of one or more variables are identified by using a statistical model that is build based on historical data of the website and the change in real-time ranking is determined by correlating the overall score for the website with its organic search ranking on a search engine for a particular keyword/theme.

It is a further object of the present invention to provide a system for predicting a real time change in an organic search ranking of a website, the system comprising: a processor; a statistical model executing on the processor and configured to: identify one or more variables that impact the organic search ranking of the website; calculate an overall score based on the one or more variable of the website; calculate a competition score based on changes made on at least one competitor's website, and a simulation interface executing on the processor and configured to enable a user to make changes to the one or more variables; determine a real time change in organic search ranking of the website based on a change in the overall score and the competition score.

It is another object of the present invention to provide a computer program product for predicting a real-time change in organic search ranking of a website; the computer program product comprising at least one non-transitory computer-readable storage medium having computer-readable program code portions stored therein, said computer-readable program code portions comprising instructions for performing the aforementioned method.

Some or all of the aforementioned advantages of the invention are accrued by configuring the system to consider the on-page, off-page, social and technical variables of a web page, calculating the real-time overall score for the web page and correlating the actual ranking of the web page with the overall score.

Further advantages and features of the present invention are considered by configuring system for tracking the historical and/or real-time changes made on the one or more variables of at least one competitor's web page for calculating the completion score. This will enable the system to predict real-time ranking of the website more precisely.

This invention is pointed out with particularity to the appended claims. Additional features and advantages of the system will become apparent to those skilled in the art by referring to the following detailed description taken in conjunction with the accompanying drawings.

BRIEF DESCRIPTION OF DRAWINGS

The features of the present invention, which are believed to be novel, are set forth with particularity in the appended claims. The invention may best be understood by reference to the following description, taken in conjunction with the accompanying figures. These figures and the associated description are provided to illustrate some embodiments of the invention, and not to limit the scope of the invention.

In the following the invention will be described in greater detail with reference to exemplary embodiments in accordance with the accompanying drawings, in which.

The features of the invention illustrated above and below in the specification, are described with reference to the drawings summarized above. The reference numbers shown in the drawings may be used at one or more places to indicate the functional relation between the referenced elements. Some of the embodiments are described in the dependent claims.

DETAILED DESCRIPTION OF EMBODIMENTS

The following detailed description is merely exemplary in nature and is to enable any person skilled in the art to make and use the invention. The examples shown in description are not intended to limit the application and uses of the various embodiments. Various modifications to the disclosed invention will be readily apparent to those skilled in the art, and the methodology defined herein may be applied to other embodiments and applications without departing from the spirit and scope of the present disclosure. Thus, the present invention is not limited to the examples shown, but is to be accorded the widest scope consistent with the methodology and features disclosed herein. It should also be noted that FIGS. 1-13 are merely illustrative and may not be drawn to scale.

Figure 1:
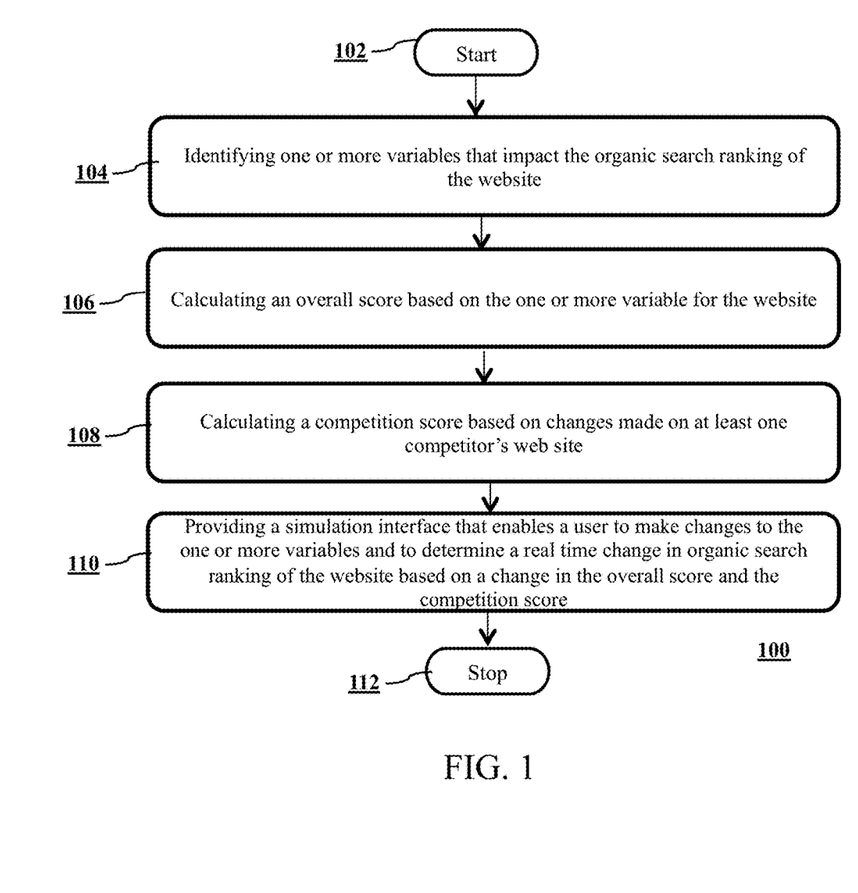
FIG. 1 demonstrates a flow chart representing a method predicting a real-time change in an organic search ranking of a website in accordance with an embodiment of the present invention.

Embodiments of the present invention provide a system and a method system for predicting a real-time change in an organic search ranking of a website. Referring to FIG. 1, an embodiment of the present invention provides a method 100 for predicting a real-time change in an organic search ranking of a website. The method 100 can be implemented in the form of a computer program on any computing device such as a computer system, mobile and others dedicated systems.

The method 100 initiates at step 102.

In step 104, one or more variables are identified by the system that impacts the organic search ranking of the website. In an embodiment of the present invention, the one or more variables are on-page variables, off-page variable, technical variable and social variable. The on-page variable includes one or more of a page title, page content, language of content and format/style of content, URL density, meta-density, H1 density, H2 density and Alt Tag density etc. The off-page variable includes number of links of other websites, type of link and link domain etc. The technical variable includes page loading time, page re-directs, size of content, front end and back end issue, site map, robot.txt etc. Similarly, the social variables includes one or more of comments on content, content shares, link shares, viewer reviews, FACEBOOK likes, FACEBOOK shares, FACEBOOK comments, LINKEDIN likes, LINKEDIN shares, other social networking features, marketing and advertisements etc.

In step 106, an overall score is calculated based on the one or more variable for the website. In an embodiment of the present invention, an individual score is assigned to each identified variable based on their individual impact on the organic search ranking of the website.

In some embodiment, a higher score is assigned to the variable having substantially higher impact on the organic search ranking of a website. The individual impact of each variable may be determined by using a statistical model that is build based on historical data of the website. Various algorithms can be deployed for evaluating the individual impact of the each variable.

In another embodiment of the present invention, the one or more variables are categorized into one or more categories such as on-page, off-page, technical and social category of variables. Based on the individual scores of the variable a category score may be calculated and displayed.

In step 108, a competition score is calculated based on changes made on at least one competitor's web site. The competition score is calculated by tracking the historical data and/or real time changes made on the one or more variables of at least one competitor's web page.

In step 110, a simulation interface is provided that enables a user to make changes to the one or more variables and to determine a real time change in organic search ranking of the website based on a change in the overall score and the competition score. In an embodiment of the present invention, the change in real-time ranking is determined by correlating the overall score for the website with its actual organic search ranking on a search engine for a particular keyword/theme.

In another embodiment of the present invention, the real-time change in the organic search ranking is determined by plotting a curve that correlates the overall score for the website with its actual organic search ranking on a search engine for a particular keyword/theme.

The method ends at step 112.

Figure 2:
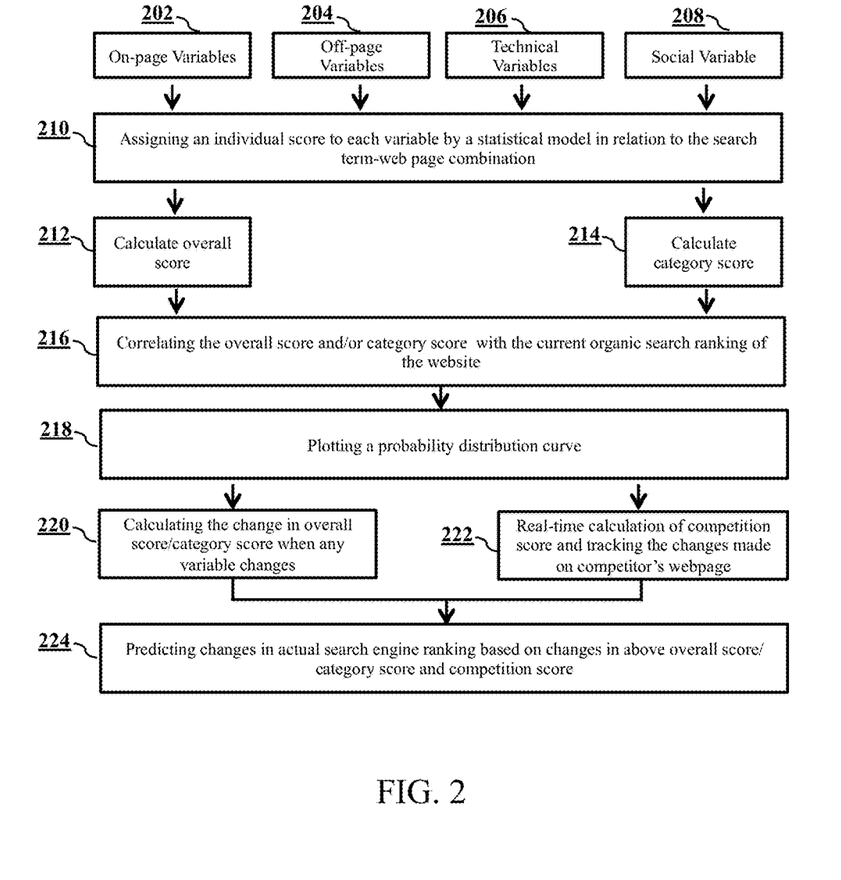
FIG. 2 demonstrates a flow diagram for predicting a real-time change in an organic search ranking of a website in accordance with another embodiment of the present invention.

FIG. 2 demonstrates a flow diagram in accordance with an embodiment of the present invention. In the embodiment, the system categorizes the one or more variables in to category such as on-page variable 202, off-page variable 204, technical variable 206 and social variable 208. Afterward in step 210, an individual score is assigned to each variable. The score is assigned based on the impact of each variable in the organic search ranking. This impact can be determined by analyzing the historical data of the website. Further, the system calculates the overall score 212 and the category score 214 of the webpage.

Afterward in step 216, the system correlates the overall score and/or the category score with the actual organic search ranking of the website. In step 218, a probability distribution curve is plotted to visualize the change in the overall score and/or the category score of the website. Further in 220, the system calculate the change in overall score/category score when any variable changes. In step 222, the system tracks the changes made on competitor's webpage for the same time and calculates a real-time competition score. Further based on the changes in the overall score and the competition score, in step 224 the system predicts the changes in actual search engine ranking of the website.

In an embodiment of the present invention, individual score to each variable is assigned according to information and/or historic data obtained from a storage medium. The individual score may be assigned by considering how differently or dynamically the rank of the website had changed with respect to a search query. This can be implemented by employing a statistical model. The statistical model may describe the change in organic search ranking by visualizing a set of probability distributions against the identified variables and the actual organic search ranking of the website.

In another embodiment of the present invention the competition score may be assigned by considering the availability of new competitor websites, modifications to existing competitor's websites, and/or transformation in the popularity of competitor's websites due to demographics, fad, changes in on-page, off-page, social and technical variables and rank movement for the competitor website and other factors. Accordingly, the statistical model may update itself by tracking the information and/or historical data of competitor websites and may assign a competition score. The competition score may be assigned by considering a single competitor's website or by considering a plurality of competitor's web-sites.

Figure 3:
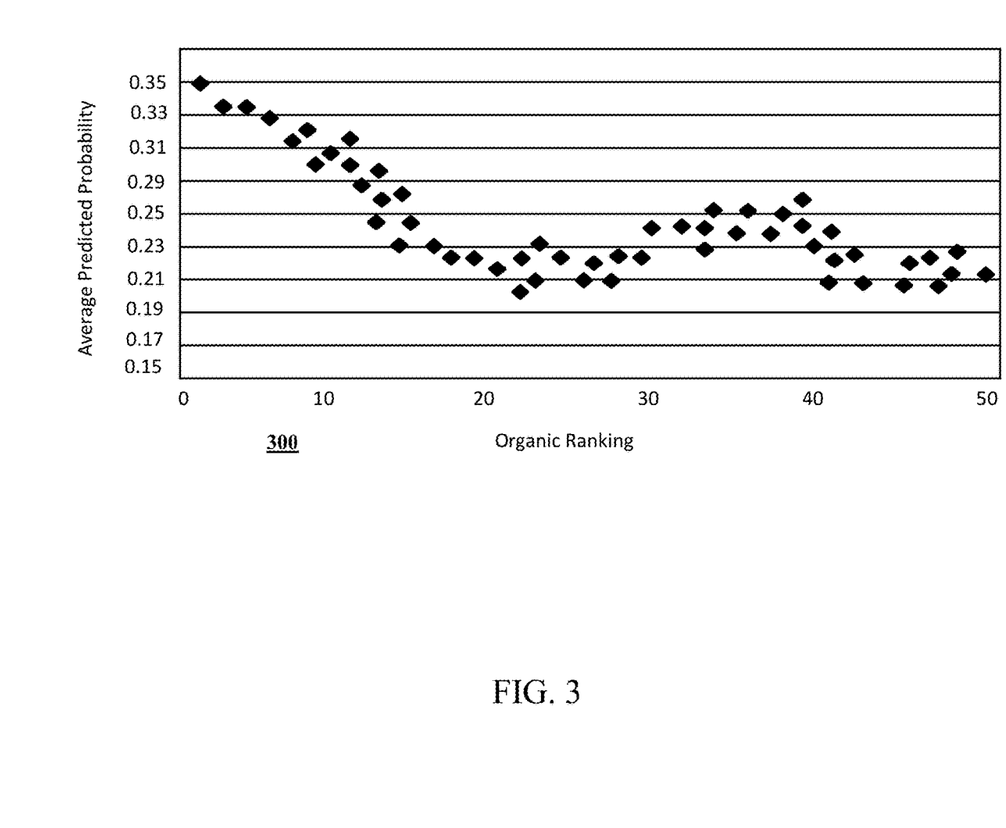
FIG. 3 demonstrates a graphical represent of ranking correlation in accordance with an embodiment of the present invention.

FIG. 3 demonstrates a probability distribution plot which indicates the correlation of the overall score with the actual organic search ranking of the website. In the plot, the overall score is correlated with the actual ranking of the website in the search engine results for a search query/keyword. The plot indicates that if a webpage has a probability 0.35 and a competitor's webpage has a probability 0.33 in the probability distribution plot, the relevance of this webpage to the keyword is more than the competitor's and will rank above it.

Figure 4:
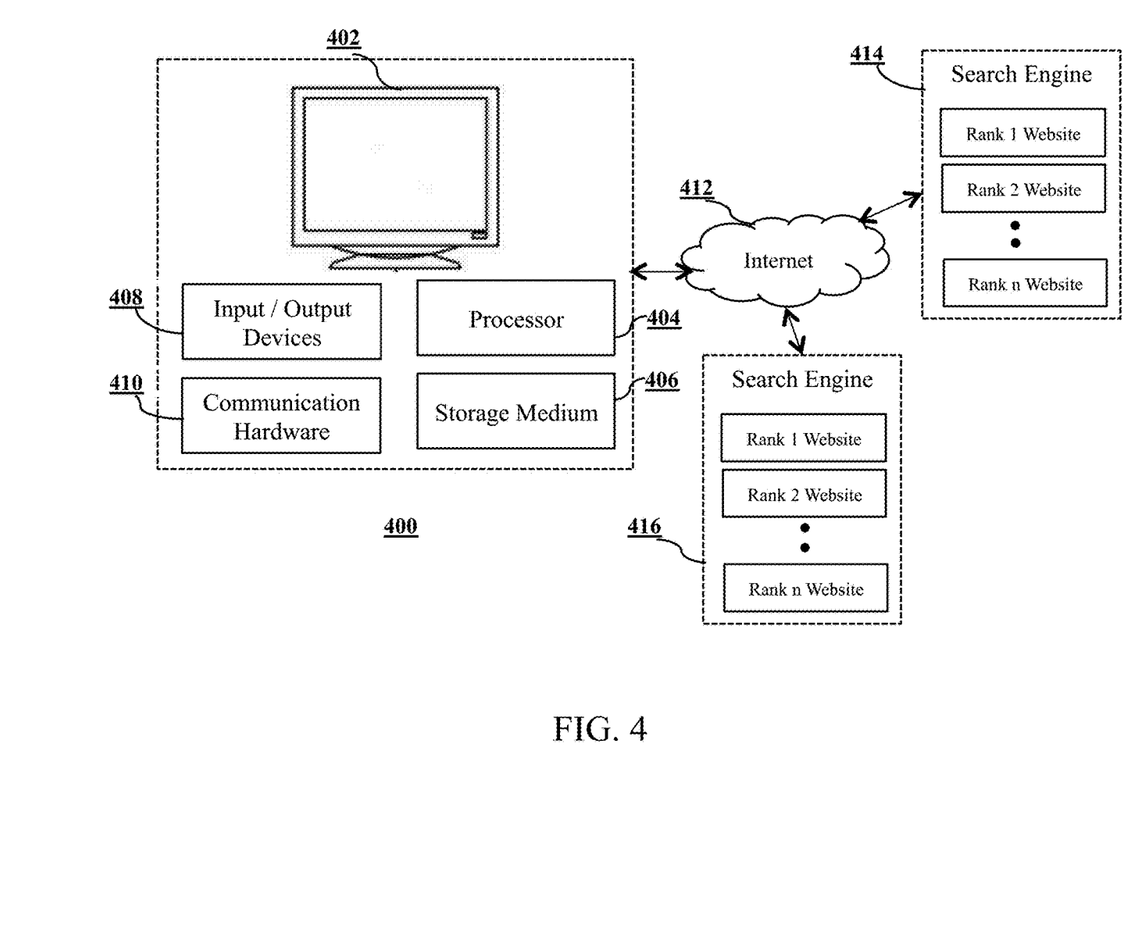
FIG. 4 demonstrates a system for predicting a real-time change in an organic search ranking of a website in accordance with an embodiment of the present invention.

FIG. 4 demonstrates a system 400 for predicting a real-time change in an organic search ranking of a website. The system 400 includes a computing device 402 that further includes a processor 404 and storage medium 406. The processor 404 executes the instructions stored in the storage medium 406. The storage medium 406 includes a statistical model executing on the processor. The statistical model is configured to identify one or more variables that impact the organic search ranking of the website, calculate an overall score based on the one or more variable for the website, and calculate a competition score based on changes made on at least one competitor's website.

The storage medium 406 further includes a simulation interface executing on the processor 404 and configured to enable a user to make changes to the one or more variables, determine a real time change in organic search ranking of the website based on a change in the overall score and the competition score.

In an embodiment of the present invention, computing device 402 further includes communication hardware 410 that enables the computing device 402 to connect to the internet network 412. The computing device 402 also includes input/output devices 408 to interact with the computing device 402.

The system 400 enables the user to input a search query on a search engine 414 and obtain the search result corresponding to that search query. The system 400 is enabled to track and collect the data from the various search engines such as search engine 414 and search engine 416.

In an embodiment of the present invention, the system 400 is enabled to track the user's website data and the competitor's website data from a common search engine. In other embodiments of the present invention, the system 400 is enabled to track the user's website data and the competitor's website data from a plurality of search engine.

The user may modify the variables using the simulation interface and may visualize the individual score of the variable and determine a real-time change in organic search ranking of the website based on a change in the overall score and the competition score.

In another embodiment of the present invention, the storage medium 406 is a non-transitory storage medium. The non-transitory storage medium may be any device that can store code to use by a computer system, mobile and others. The non-transitory storage medium may include, but is not limited to a volatile memory, non-volatile memory, magnetic and optical storage devices such as disk drives, magnetic tape, CDs (compact discs), DVDs (digital versatile discs or digital video discs), or other media capable of storing code now known or later developed.

Figure 5:
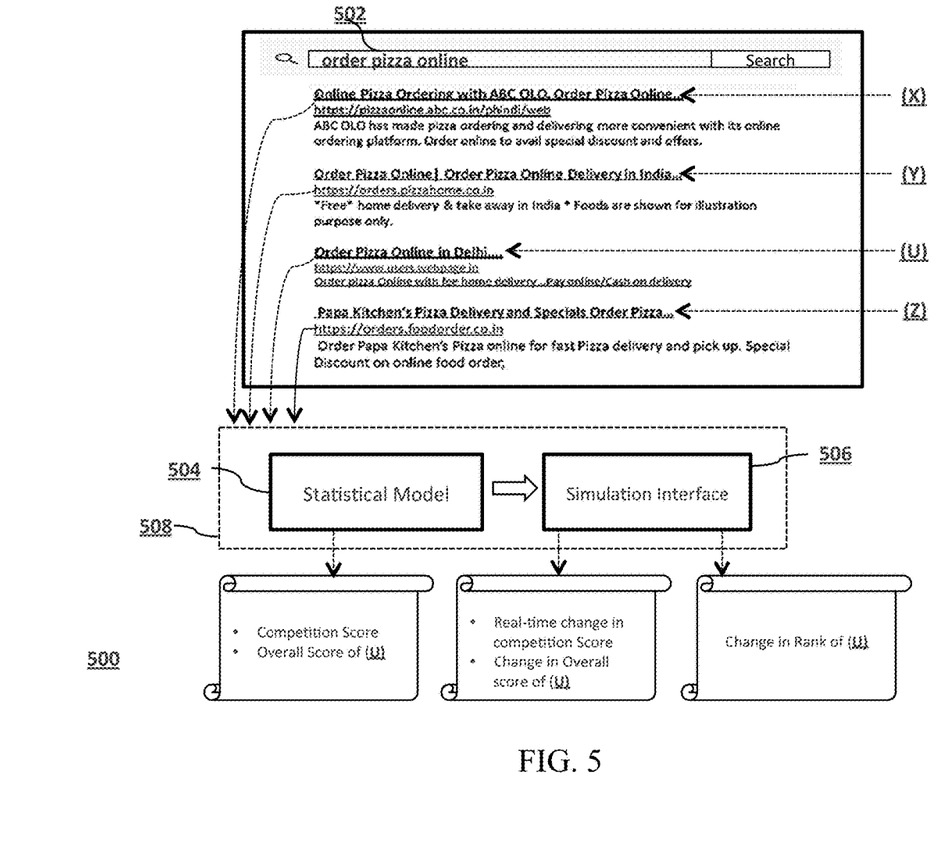
FIG. 5 demonstrates an exemplary embodiment for predicting a real-time change in an organic search ranking of a website in accordance with an embodiment of the present invention.

In an exemplary embodiment 500 of the present invention as depicted in FIG. 5, on searching a query/keyword such as "order pizza online" on a search engine 502, a list of webpages has shown in which the rank of user's webpage (U) is 32. The webpage (X), (Y) and (Z) are competitors' webpages and their ranks are 30, 31 and 33 respectively. In the exemplary embodiment, the system 400 tracks the user's webpage (U) and identifies the variables that impact the organic search ranking of the webpage (U). Using the statistical model 504, the system 400 calculates the score of user's webpage (U) for the query/keyword: "order pizza online".

Further, the system 400 identifies the variable impacting the organic search ranking of the competitors' webpages (X), (Y) and (Z) and calculates a competition score corresponding to the each competitor's webpage.

Further, the user may modify the variables using the simulation interface 506. The user may visualize the change in overall score corresponding to the change in each variable. Simultaneously, the system 400 tracks the changes made on competitors' webpages (X), (Y) and (Z) and calculates the change in the competition score. Based on the change in the overall score and the competition score the rank of the change in organic search ranking of the user's webpage (U) is determined.

In an exemplary embodiment of the present invention, if the overall score of the webpage is changes from 234 to 360, the rank may substantially change from 32 to 30.

Figure 6:
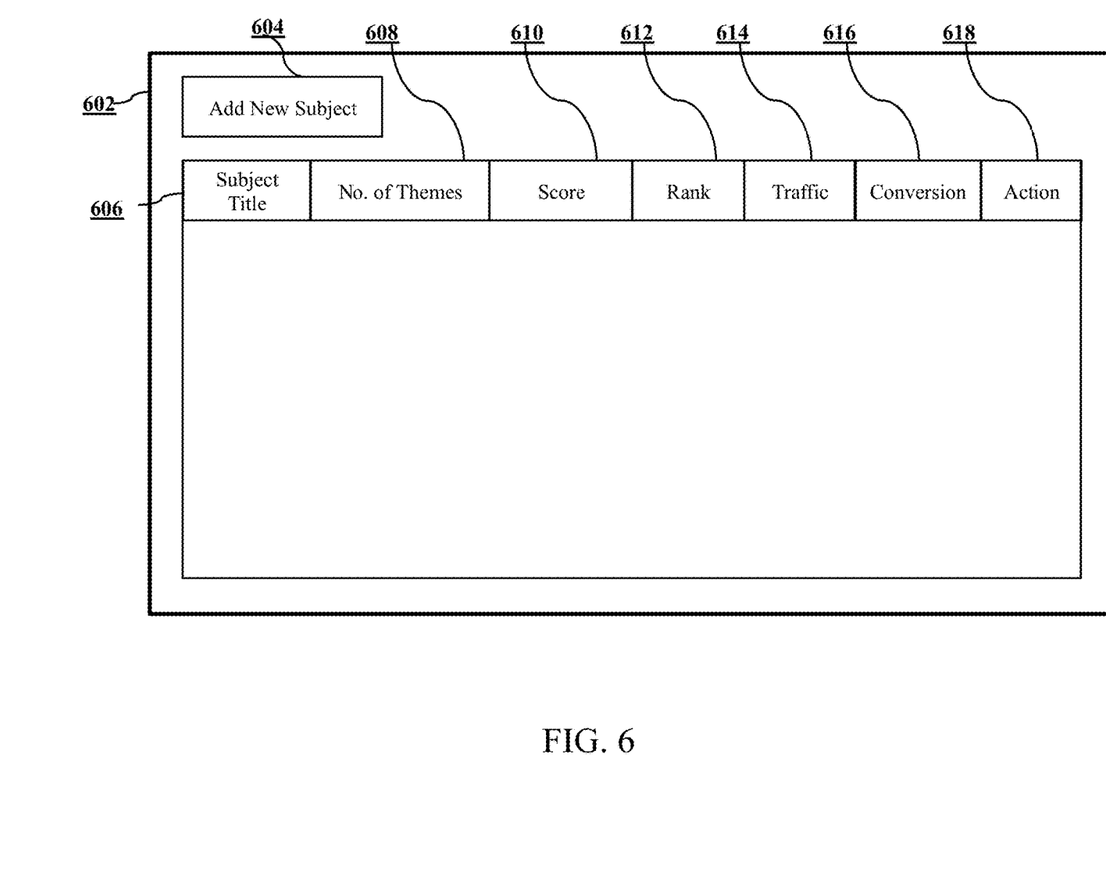
FIG. 6 demonstrates a simulation interface in accordance with another embodiment of the present invention.

FIG. 6 demonstrates a simulation interface 602 in accordance with an embodiment of the present invention. The simulation interface 602 enables the user to select and/or modify the one or more variables for improving the ranking of the website.

In an exemplary embodiment of the present invention, a user may add new subject 604 using the stimulation interface 602. The added subjects may include a subject title 606, no. of themes 608, score 610 for the subject, rank 612, traffic 614, conversion 616 and action 618. The user may enter the plurality of subjects.

Figure 7:
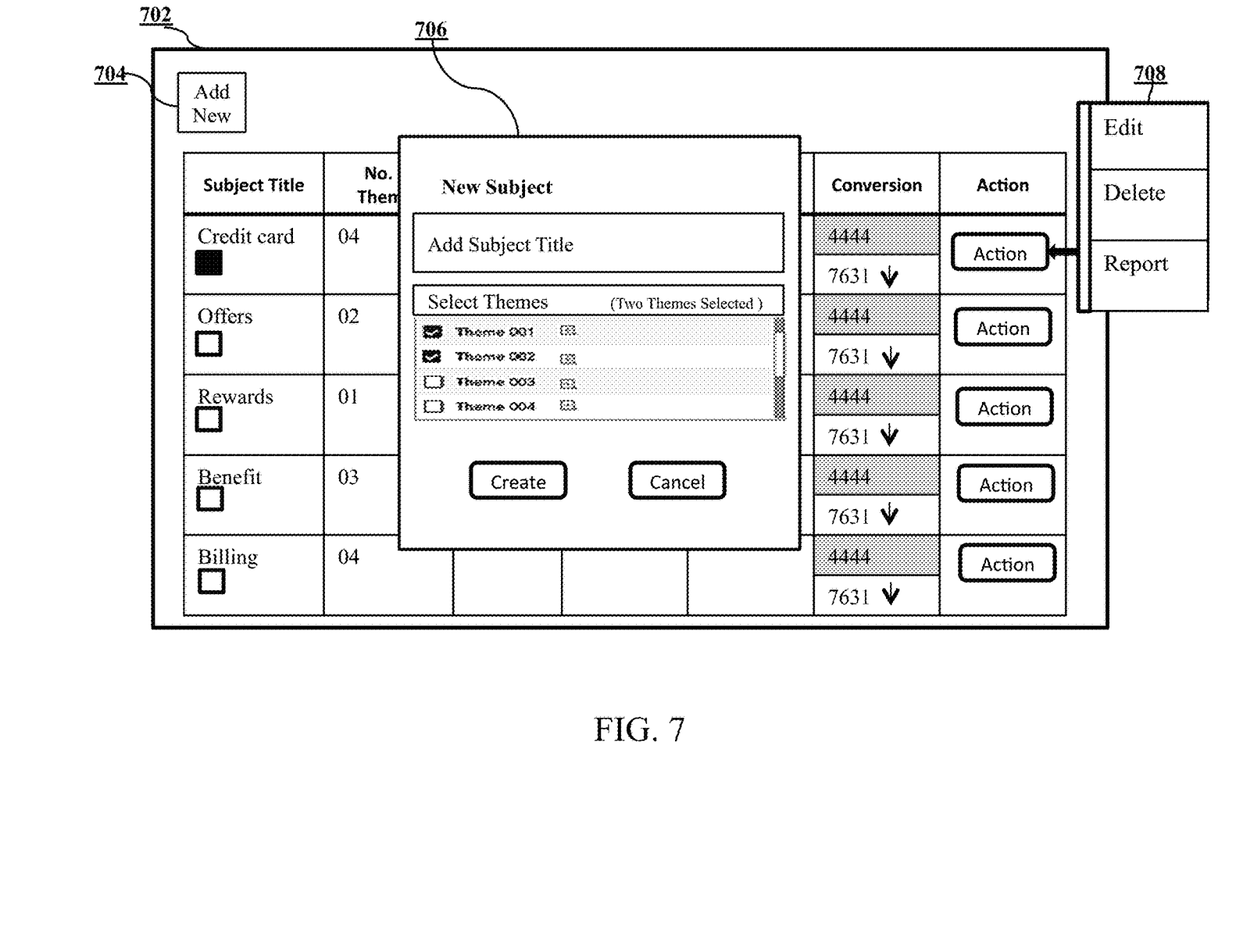
FIG. 7 demonstrates a simulation interface in accordance with another embodiment of the present invention.

As depicted in FIG. 7, in an exemplary embodiment of present invention, the website may be related to a financial institution and the subjects may be credit card, offers, benefit and billing etc. Other subject may be added by clicking on Add New 704 given on the simulation interface 702. On clicking on Add New 704 a pop up window may be opened in which the user may enter the Subject Title and may select the appropriate themes from a menu list. By clicking on create the user may add new subject and further he may check the particular score and rank for the subject for a particular theme.

The user may Edit, Delete and Create Report by clicking on corresponding options of a menu list by clicking of Action 708.

Figure 8:
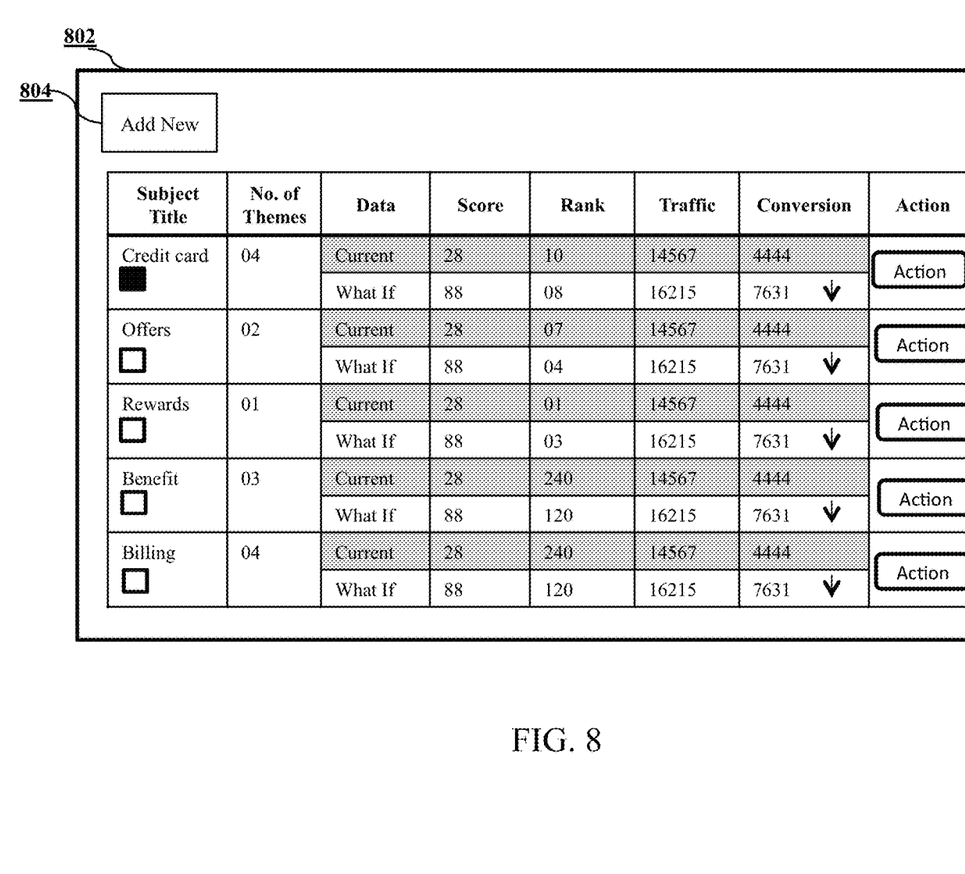
FIG. 8 demonstrates a simulation interface in accordance with another embodiment of the present invention.

As depicted in FIG. 8, in an exemplary embodiment of present invention, the user may add using an Add New 804 and further select a desired subject and check the current score, rank, traffic and conversion against the each subject. The user may change the score to check the change in the organic search ranking of the webpage for the selected theme. The user may also visualize the change in traffic and conversion for the selected theme.

Figure 9A:
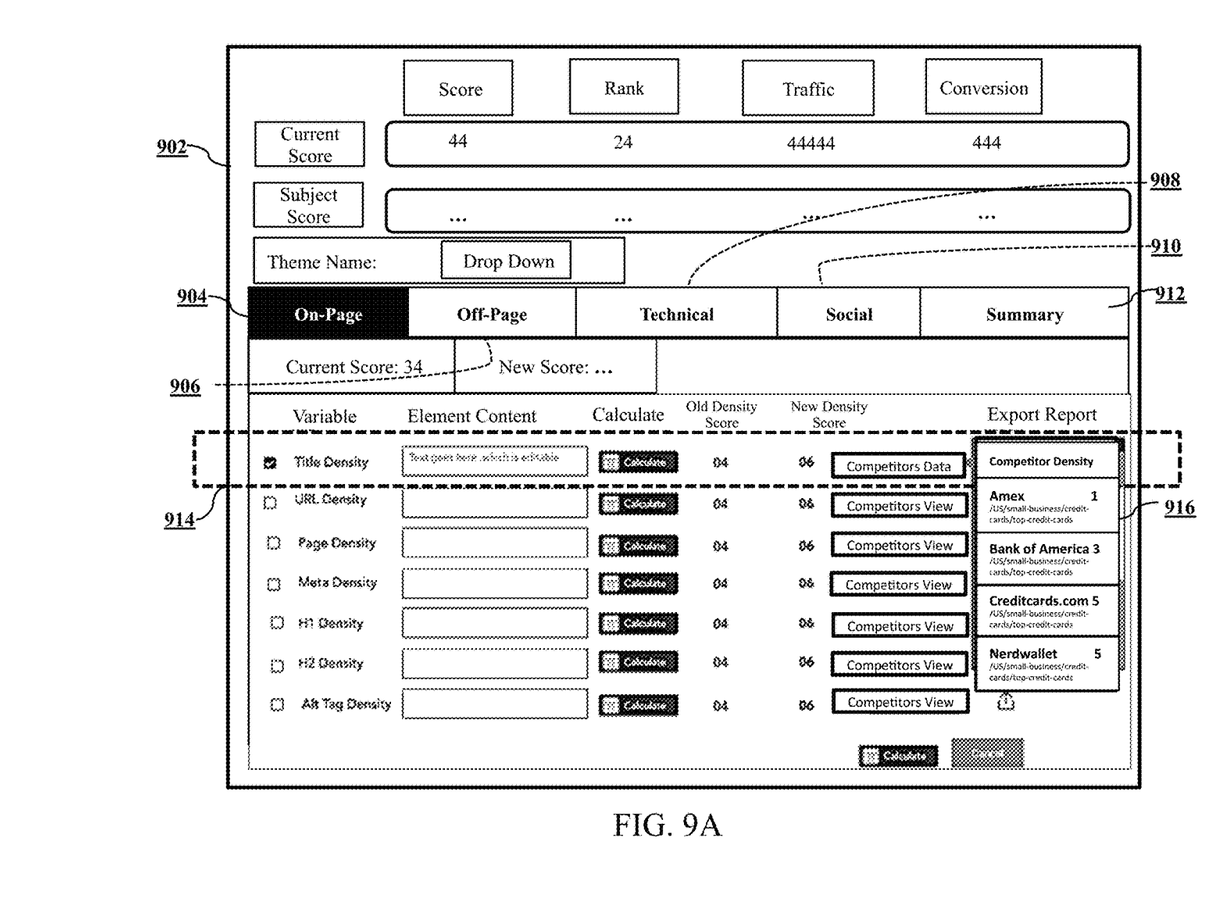
FIG. 9A demonstrates a simulation interface in accordance with another embodiment of the present invention.

FIG. 9A demonstrates the simulation interface 902 in accordance with an exemplary embodiment of the present invention. As depicted in figure, the variables of the website may be categorized into on-page 904, off-page 906, technical 908 and social 910 variables. The user may select the desired category of variable for modification. In the present embodiment, the on-page 904 variables have been selected that includes variables such as Title Density 914, URL Density, Page Density, Meta Density, H1 Density, H2 Density and Alt Tag Density. The user may modify the desired variable and may visualize the new score corresponding to the variable and compare it with the old score. In the exemplary embodiment, the Title density 914 has been selected for modification. The user may also visualize the competitors data and corresponding completion score 914.

Figure 9B:
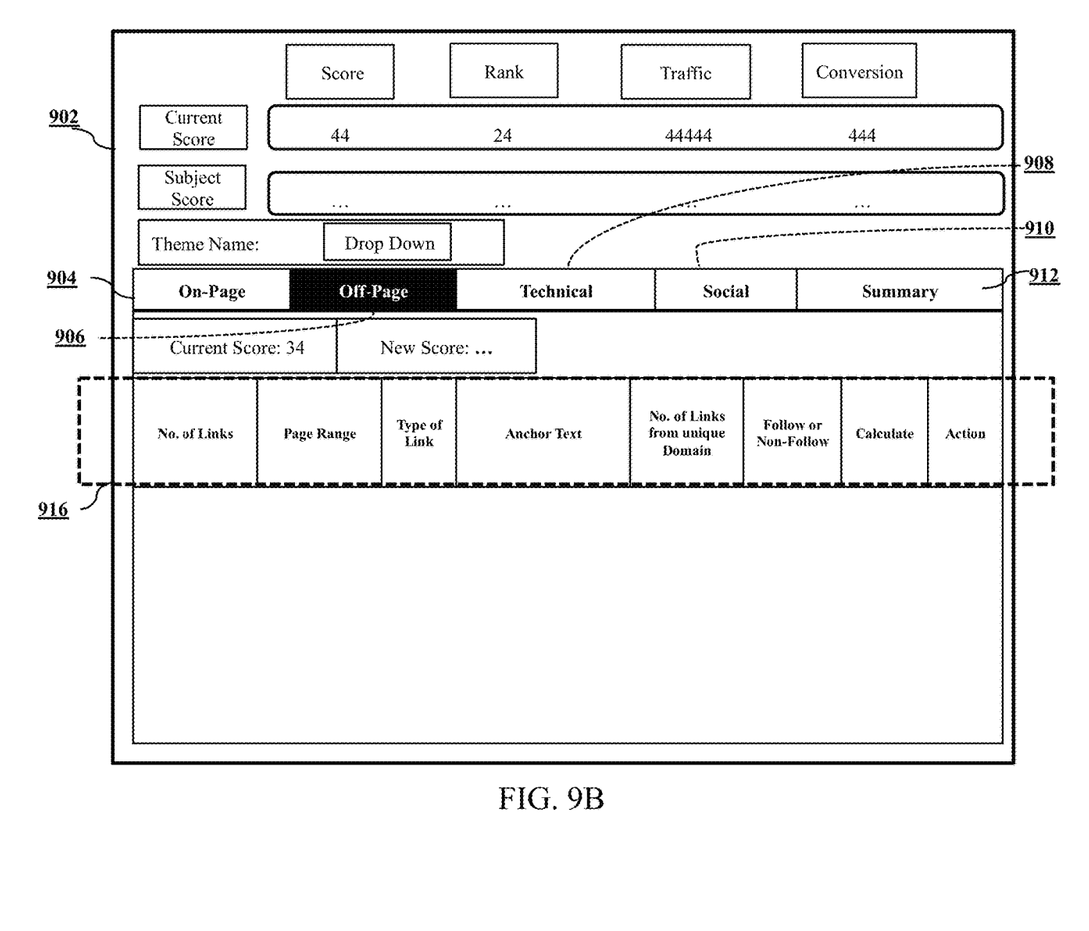
FIG. 9B demonstrates a simulation interface in accordance with another embodiment of the present invention.

FIG. 9B demonstrates another exemplary embodiment of the present invention. In the embodiment, a simulation interface 902 the user has selected the off-page category 906 of variables. The user may select and/or modify 916 any of the off-page variables such as no. of links, Page range, type of link, Anchor text, no. of link from unique domain, follow or non-follow etc. The user may calculate and visualize the score for the modified variable and further may visualize the change in real-time ranking of the website.

Figure 9C:
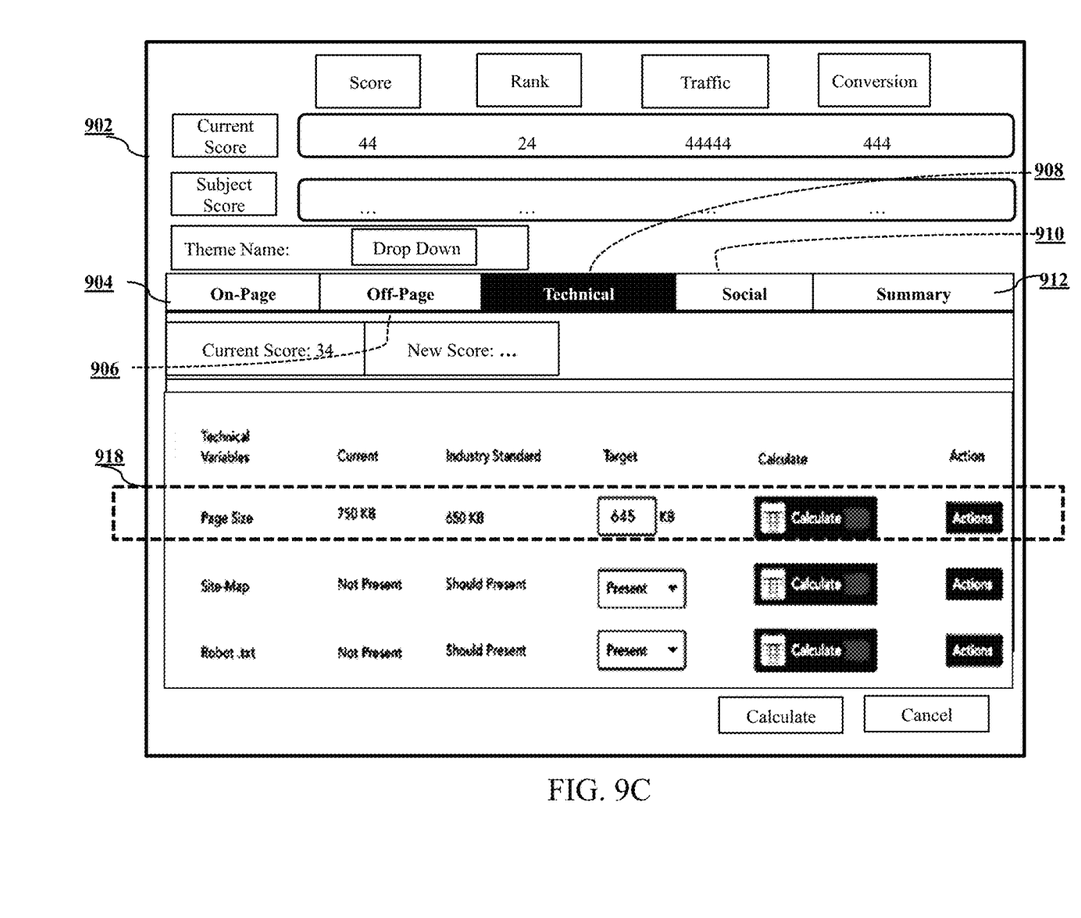
FIG. 9C demonstrates a simulation interface in accordance with another embodiment of the present invention.

FIG. 9C demonstrates another exemplary embodiment of the present invention. In the embodiment, the user has selected technical category 908 of the variables. The user may select and modify any of technical variables page size, site-map, robot.txt etc. In the embodiment, user has selected the page size 918 to be modified. After selecting the page size, the user may calculate the change in score and further change in organic search ranking of the website.

Figure 9D:
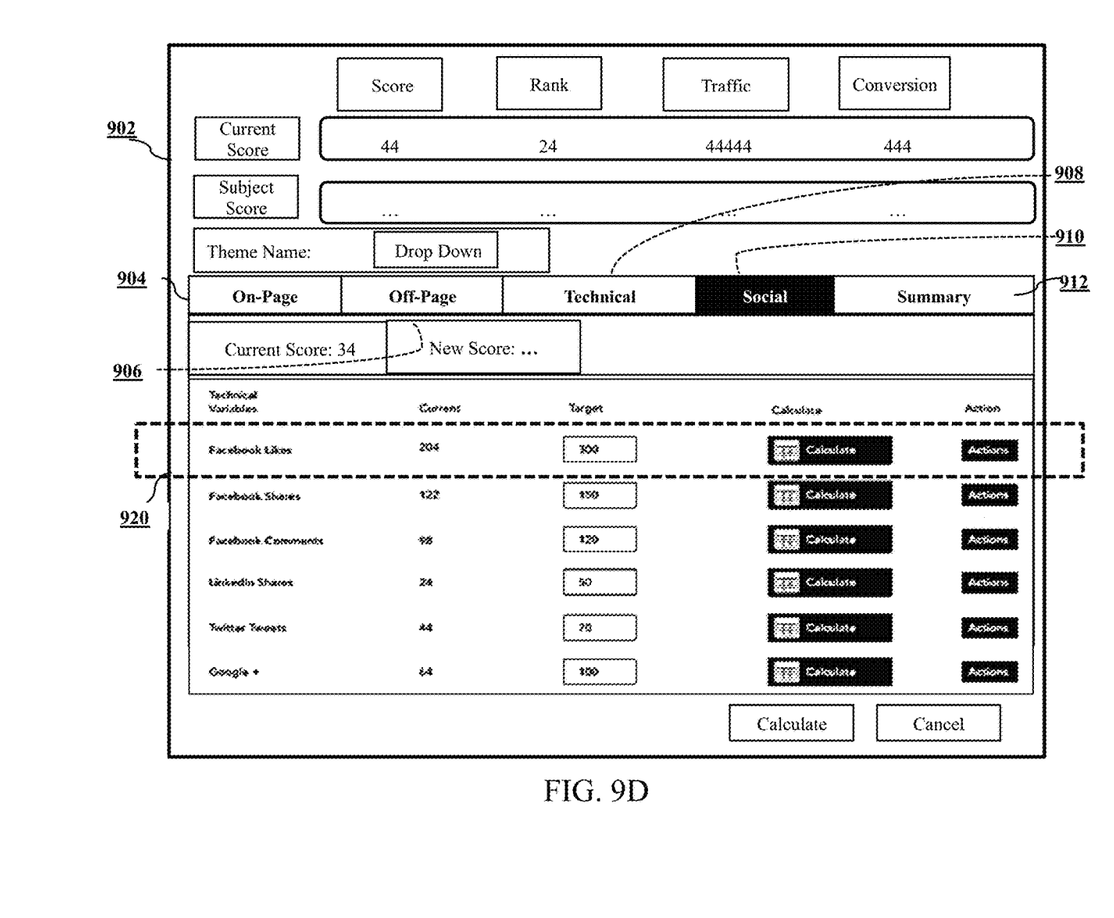
FIG. 9D demonstrates a simulation interface in accordance with another embodiment of the present invention.

FIG. 9D demonstrates another exemplary embodiment of the present invention. In the embodiment, the user has selected social category 910 of the variables. The user may select the any of the social variable 920 including FACEBOOK likes, FACEBOOK shares, FACEBOOK comments, LINKEDIN shares, TWITTER tweets and GOOGLE+ etc. and may modify them and further may visualize the change in the organic search ranking of the website.

Figure 9E:
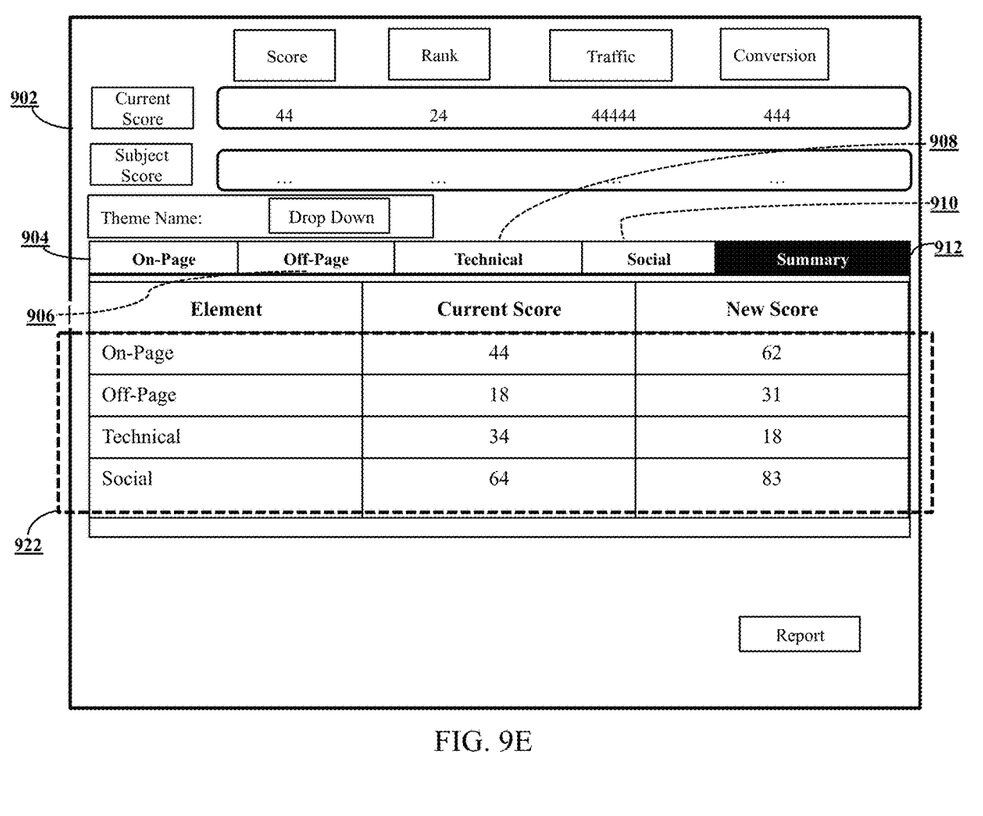
FIG. 9E demonstrates a simulation interface in accordance with another embodiment of the present invention.

FIG. 9E demonstrates another exemplary embodiment of the present invention. In the embodiment, summary option 912 is given to the user. By selecting the summary option 912, the user may be provided with a pop up display 922 and may compare the current category score and the category score after the modifications. In the embodiment, the user may also generate a report.

A further embodiment of the present invention provides a computer program product arranged for predicting a real-time change in the organic search ranking of a website. The computer program product comprising at least one non-transitory computer-readable storage medium having computer-readable program code portions stored therein, said computer-readable program code portions comprising instructions for performing aforementioned method 100. Various algorithms may be deployed for performing the method 100.

Though exemplary embodiments have been presented in the foregoing detailed description of the invention, it should be appreciated that a vast number of variations exist. It should also be note that the disclosed embodiments and methods are not intended to limit the scope and applicability of the invention in any way.

Rather, the foregoing detailed description will provide those skilled in the art with a convenient road map for implementing an exemplary embodiment of the invention, it being understood that various changes may be made in the methods and order of steps described in an exemplary embodiment without departing from the scope of the invention as set forth in the appended claims and their legal equivalents.

The invention claimed is:

1. A method being implementable on a computing device for predicting a real time change in an organic search ranking of a website, the method comprising:
    identifying a plurality of variables, including one or more technical variables, that impact the organic search ranking of the website;
    calculating an individual score based on each of the plurality of variables of the website;
    calculating an overall score based on the plurality of individual scores;
    calculating individual scores for at least one competitor's website based on each of the plurality of variables of the at least one competitor's website;
    calculating a competition score based on the individual scores for the at least one competitor's website;
    providing a simulation interface that enables a user to:
        view the individual scores for the website;
        view at least some of the individual scores for the at least one competitor's website;
        specify the one or more variables for the website; and
        calculate updated individual scores for the website based on the user-specified variable(s);
    calculating an updated overall score based on the updated individual scores for the website; and
    determining an estimated organic search ranking of the website based on the updated overall score and the competition score.

2. The method as claimed in claim 1, wherein the plurality of variables further include one or more of on-page variables, off-page variables, and social variables.

3. The method as claimed in claim 2, wherein the one or more on-page variable(s) include one or more of a page title, page content, language of content, URL density, meta density, H1 density, H2 density and Alt Tag density.

4. The method as claimed in claim 2, wherein the one or more off-page variable(s) include one or more of number of links of other websites, type of link, and link domain.

5. The method as claimed in claim 2, wherein the one or more social variable(s) include one or more of comments on content, content shares, link shares, viewer feedback, social network likes, social network shares, social network comments, and other social networking features.

6. The method as claimed in claim 1, wherein the one or more technical variable(s) include one or more of page loading time, page re-directs, site map, and robot.txt.

7. The method as claimed in claim 1 further comprising:
    categorizing the plurality of variables into one or more categories;
    calculating a category score for each of the one or more categories based on the plurality of variables; and
    displaying the category score for each of the one or more categories.

8. The method as claimed in claim 1, wherein the overall score is calculated using a statistical model that is built based on historical data of the website.

9. The method as claimed in claim 1, wherein the overall score is calculated by weighting each of the individual scores based on their individual impact on the organic search ranking.

10. The method as claimed in claim 1, wherein the estimated organic search ranking is determined by correlating the updated overall score for the website with its organic search ranking on a search engine for a particular keyword/theme.

11. The method as claimed in claim 1, wherein estimated organic search ranking is determined by plotting a curve that correlates the overall score for the website with its actual organic search ranking on a search engine for a particular keyword/theme.

12. The method as claimed in claim 1, wherein the competition score is calculated by tracking the historical data for the website and/or real time changes made on the one or more variables of at least one competitor's web page.

13. The method as claimed in claim 1, wherein the estimated organic search ranking of the website relative to the competitor's website is calculated for a common search engine.

14. The method as claimed in claim 1, wherein the website includes at least one webpage.

15. The method as claimed in claim 1, further comprising:
    determining estimated traffic based on the estimated organic search ranking.

16. The method as claimed in claim 1, further comprising:
    determining estimated conversion based on the estimated organic search ranking.

17. The method as claimed in claim 1, wherein the estimated organic search ranking is determined at least in part by comparing the updated overall score and the competition score calculated for the at least one competitor's website.

18. A system for predicting a real time change in an organic search ranking of a website, the system comprising:
    a processor;
    a statistical model executing on the processor and configured to:
        identify a plurality of variables, including one or more technical variables, that impact the organic search ranking of the website;
        calculate an individual score based on each of the plurality of variables of the website;
        calculate an overall score based on the plurality of individual scores;
        calculate individual scores for at least one competitor's website based on each of the plurality of variables of the at least one competitor's website; and
        calculate a competition score based on the individual scores for the at least one competitor's website; and
    a simulation interface executing on the processor and configured to enable a user to:
        view the individual scores for the website;
        view at least some of the individual scores for the at least one competitor's website;
        specify the one or more variables for the website;
        calculate updated individual scores for the website based on the user-specified variable(s);

calculate an updated overall score based on updated individual scores; and determine an estimated organic search ranking of the website based on the updated overall score and the competition score.

19. A non-transitory computer-readable storage medium storing a computer-readable program code that, when executed by a processor, causes a computing system to:

identify a plurality of variables, including one or more technical variables, that impact the organic search ranking of the website;

calculate an individual score based on each of the plurality of variables of the website;

calculate an overall score based on the plurality of individual scores;

calculate individual scores for at least one competitor's website based on each of the plurality of variables of the at least one competitor's website;

calculate a competition score based on the individual scores for at least one competitor's website;

provide a simulation interface that enables a user to:
view the individual scores for the website;
view at least some of the individual scores for the at least one competitor's website;
specify the one or more variables for the website; and calculate an updated overall score based on updated individual scores; and determine an estimated organic search ranking of the website based on the updated overall score and the competition score.

* * * * *